United States Patent
Im et al.

(10) Patent No.: US 9,599,002 B2
(45) Date of Patent: Mar. 21, 2017

(54) ENGINE CONTROL METHOD FOR MAINTAINING PERFORMANCE OF OXIDATION CATALYST

(71) Applicant: Doosan Infracore Co., Ltd., Incheon (KR)

(72) Inventors: In-hyuk Im, Incheon (KR); Nam-il Choi, Incheon (KR); Jun-hee Won, Incheon (KR); Tae-hyung Kim, Incheon (KR)

(73) Assignee: Doosan Infracore Co., Ltd., Incheon (KR)

( * ) Notice: Subject to any disclaimer, the term of this patent is extended or adjusted under 35 U.S.C. 154(b) by 0 days.

(21) Appl. No.: 14/871,347

(22) Filed: Sep. 30, 2015

(65) Prior Publication Data

US 2016/0097313 A1 Apr. 7, 2016

(30) Foreign Application Priority Data

Oct. 1, 2014 (KR) ........................ 10-2014-0132259

(51) Int. Cl.
*F01N 9/00* (2006.01)
*F01N 3/10* (2006.01)
*F01N 3/20* (2006.01)

(52) U.S. Cl.
CPC ............... *F01N 9/00* (2013.01); *F01N 3/103* (2013.01); *F01N 3/20* (2013.01); *F01N 2260/04* (2013.01); *F01N 2430/06* (2013.01); *F01N 2550/02* (2013.01); *F01N 2560/06* (2013.01); *F01N 2570/12* (2013.01); *F01N 2900/0422* (2013.01); *F01N 2900/08* (2013.01); *F01N 2900/102* (2013.01); *F01N 2900/1602* (2013.01); *F01N 2900/1621* (2013.01); *F01N 2900/1626* (2013.01)

(58) Field of Classification Search
CPC ........ F01N 3/0885; F01N 9/00; F01N 3/2016; F01N 11/002; F01N 2550/05
USPC .................................. 60/285, 286, 295, 299
See application file for complete search history.

(56) References Cited

U.S. PATENT DOCUMENTS

| 2010/0217506 A1* | 8/2010 | Mizoguchi ............ F01N 11/007 701/109 |
| 2012/0253642 A1* | 10/2012 | Kitano ................ F02D 41/0085 701/104 |
| 2013/0186066 A1* | 7/2013 | Shinoda .................... F01N 3/10 60/274 |

(Continued)

FOREIGN PATENT DOCUMENTS

JP 07109918 A * 4/1995

*Primary Examiner* — Patrick Maines
(74) *Attorney, Agent, or Firm* — K&L Gates LLP

(57) ABSTRACT

In an engine control method for maintaining performance of oxidation catalyst, fuel of a compressed natural gas engine under a lean-burn condition with an air-fuel equivalence ratio less than or equal to 1 is burned. Activation of the oxidation catalyst for purifying an exhaust gas of the engine is determined. Necessity of a regeneration mode for recovering catalytic activation of the oxidation catalyst according to an activation state of the oxidation catalyst and an operating condition of the engine is determined. And, the air-fuel equivalence ratio is increased to a range of from 1.10 to 1.20 when the oxidation catalyst is inactive and an engine speed is lower than a predetermined speed.

9 Claims, 5 Drawing Sheets

(56) References Cited

U.S. PATENT DOCUMENTS

2014/0230416 A1* 8/2014 Nobukawa .............. F01N 3/103
  60/286
2015/0337750 A1* 11/2015 Sealy ................. F02D 41/0235
  60/274

* cited by examiner

ENGINE CONTROL METHOD FOR MAINTAINING PERFORMANCE OF OXIDATION CATALYST

CROSS-REFERENCE TO RELATED APPLICATION

This application claims priority under 35 USC §119 to Korean Patent Application No. 10-2014-0132259, filed on Oct. 1, 2014 in the Korean Intellectual Property Office (KIPO), the contents of which are herein incorporated by reference in their entirety.

FIELD OF TECHNOLOGY

Example embodiments relate to an engine control method for maintaining performance of an oxidation catalyst. More particularly, example embodiments relate to an engine control method for maintaining performance of an oxidation catalyst which purifies exhaust gas discharged from a compressed natural gas (CNG) engine.

BACKGROUND

In a compressed natural gas (CNG) engine operating under lean-burn condition, oxidation catalyst including palladium and platinum may be used to purify methane occupying most of the exhaust gas.

When oxygen is adsorbed to palladium, palladium may not function as a catalyst property. Accordingly, when the CNG engine operates under lean-burn condition, efficiency of the oxidation catalyst may be deteriorated due to excess oxygen.

SUMMARY

Example embodiments provide an engine control method for maintaining performance of oxidation catalyst.

According to example embodiments, in an engine control method for maintaining performance of oxidation catalyst, fuel of a compressed natural gas engine may be burned under a lean-burn condition with an air-fuel equivalence ratio less than or equal to 1. Whether an oxidation catalyst for purifying an exhaust gas of the engine is inactive may be determined Necessity of a regeneration mode for recovering catalytic activation of the oxidation catalyst may be determined according to an activation sate of the oxidation catalyst and an operating condition of the engine. When the oxidation catalyst is inactive and an engine speed is lower than a predetermined speed, the oxidation catalyst may be regenerated by increasing the air-fuel equivalence ratio from 1.10 to 1.20.

In example embodiments, determining whether the oxidation catalyst is inactive may include at least one selected from the group consisting of measuring a temperature difference between a front end and a rear end of the oxidation catalyst, measuring conversion efficiency of methane of the oxidation catalyst, measuring mileage of vehicle, measuring operating time of the vehicle, and measuring fuel consumption of the vehicle.

In example embodiments, when the temperature difference between the front and rear ends of the oxidation catalyst is less than 30° C., the oxidation catalyst may be determined to be inactive.

In example embodiments, regenerating the oxidation catalyst may include increasing the air-fuel equivalence ratio to a range of from 1.10 to 1.20 when temperature of a front end of the oxidation catalyst is in a range of 300° C. to 500° C.

In example embodiments, determining the necessity of the regeneration mode may include determining that the regeneration mode is necessary when engine speed is lower than 1000 rpm.

In example embodiments, determining the necessity of the regeneration mode may include determining that the regeneration mode is necessary when the engine operates at idle speed.

In example embodiments, the regeneration mode may continue for a predetermined time.

In example embodiments, the engine control method may further include terminating the regeneration mode when temperature of a front end of the oxidation catalyst is greater than 500° C.

In example embodiments, the engine control method may further include informing an operator that the regeneration mode is running.

BRIEF DESCRIPTION OF THE DRAWINGS

Example embodiments will be more clearly understood from the following detailed description taken in conjunction with the accompanying drawings.

FIG. 1 is a graph illustrating processes of regenerating an oxidation catalyst by controlling an amount of oxygen supplied to the oxidation catalyst;

FIG. 2 is a flow chart illustrating an engine control method for maintaining performance of an oxidation catalyst in accordance with example embodiments;

FIG. 3 is a graph illustrating concentration of methane discharged from a tailpipe versus air-fuel equivalence ratio;

FIG. 4 is a graph illustrating concentration of an exhaust gas discharged from an engine versus time according to changes of air-fuel equivalence ratio; and FIG. 5 is a graph illustrating concentration of methane discharged from a tailpipe versus an engine speed according to changes of air-fuel equivalence ratio and regeneration mode operating time.

DETAILED DESCRIPTION

Figure 1:
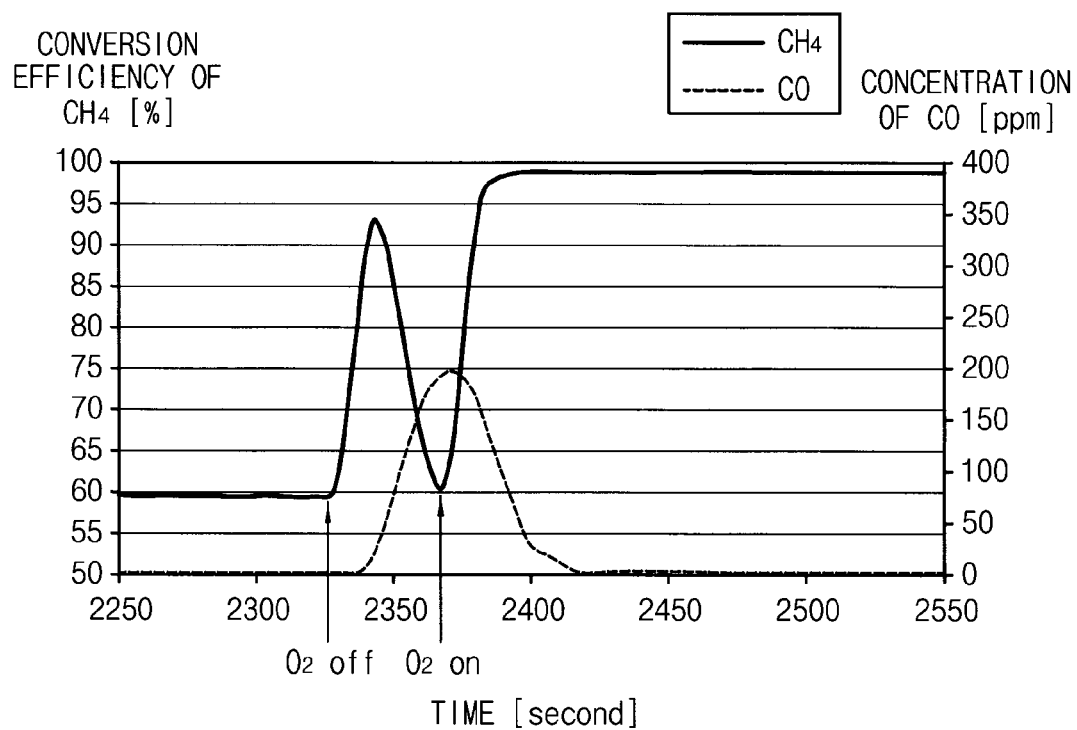
FIGS. 1 to 5 represent non-limiting, example embodiments as described herein.

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this description will be thorough and complete, and will fully convey the scope of the present inventive concept to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, fourth etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Engines designed for lean-burn combustion may employ higher compression ratios and thus provide better performance, efficient fuel use, etc. In the lean-burn condition, an ideal perfect combustion may not occur. Therefore, a highly efficient exhaust purification system may be required to reduce pollutant emissions.

In a compressed natural gas (CNG) engine, an oxidation catalyst may be used to purify a methane ($CH_4$) gas occupying most of the exhaust gas. The oxidation catalyst may include a ceramic carrier and a washcoat coated thereon. The washcoat may include a support material, e.g., alumina, ceria, zirconia, or the like, and a noble metal catalyst.

However, since an amount of moisture and oxygen are included in the exhaust gas from the lean-burn combustion, a methane gas having a relatively slow reaction rate may be oxidized hardly, thereby reducing the performance of the oxidation catalyst. The oxidation catalyst may include a noble metal, e.g., platinum, palladium, or the like. When the oxidation catalyst includes palladium, a self-poisoning phenomenon may be occurred. In particular, oxygen of the exhaust gas may be adsorbed to a surface of the oxidation catalyst, thereby deteriorating the performance of the oxidation catalyst. Accordingly, the oxygen adsorbed to the surface of the oxidation catalyst may be removed in order to maintain a performance of the oxidation catalyst.

FIG. 1 is a graph illustrating processes of regenerating an oxidation catalyst by controlling an amount of oxygen supplied to the oxidation catalyst;

Referring to FIG. 1, oxygen on a surface of an inactivated oxidation catalyst may be reduced to recover a catalytic activation of the oxidation catalyst.

In particular, when a supply of the oxygen to the inactivated oxidation catalyst is discontinued and a supply of methane to the inactivated oxidation catalyst is started, the conversion efficiency of methane may be recovered from 60% to 96%. In this case, the conversion efficiency of methane may be calculated by following equation 1.

[Equation 1]
$$\text{Conversion efficiency of } CH_4 = \frac{CH_4 \text{ emissions from engine} - CH_4 \text{ emissions from tailpipe}}{CH_4 \text{ emissions from engine}} \times 100$$

That is, the conversion efficiency of methane, which is as an index of an amount of methane removed by the oxidation catalyst, may represent the performance of the oxidation catalyst.

Alternatively, the conversion efficiency of methane may be calculated using a temperature difference between front and rear ends of the oxidation catalyst. The oxidation catalyst may oxidize methane to convert into carbon dioxide and water. This methane oxidization reaction may be an exothermic reaction, and thus temperature of the oxidation catalyst may rise. For example, when 40 ppm of methane is oxidized, the temperature of the oxidation catalyst may rise by 1° C. Accordingly, an amount of the oxidized methane may be calculated using the temperature difference between the front and rear ends of the oxidation catalyst, and the conversion efficiency of methane may be calculated using the amount of the oxidized methane.

Referring again to FIG. 1, after the supply of the oxygen is discontinued, the supplied methane may react with oxygen adsorbed to the surface of the oxidation catalyst. Oxygen adsorbed on the surface of the oxidation catalyst may be removed so that an activation region of the oxidation catalyst may be increased, and the conversion efficiency of methane may also be increased compared when the oxygen is supplied. However, when the methane supply continues, oxygen required for the oxidation reaction may be running out, and thus the conversion efficiency of methane may be decreased again.

During a period of the interruption of oxygen supply, a concentration of carbon monoxide may be continuously increased, since the supplied methane is not completely be oxidized to carbon dioxide due to oxygen deficiency.

Then, when oxygen is supplied again, the oxidation catalyst may convert methane to carbon dioxide and water through oxidation reaction. Since oxygen adsorbed on the surface of the oxidation catalyst is removed to increase an area of an activation region of the oxidation catalyst, the conversion efficiency of methane may be increased than before the interruption of oxygen supply. Accordingly, the increased carbon monoxide may react with oxygen to be converted into carbon dioxide.

This experiment may demonstrate processes for recovering catalytic activation of the oxidation catalyst by providing rich-burn environment for a predetermined time under the lean-burn combustion. In the rich-burn combustion, a percentage of air in a mixture gas entering an engine cylinder may be decreased and a percentage of fuel in the mixture gas may be increased. Thus, the processes of interruption and resumption of the oxygen supply in FIG. 1 may correspond to the rich-burn combustion and lean-burn combustion, respectively. That is, by operating the compressed natural gas engine, which is operated under the lean-burn condition to the rich-burn condition for a predetermined time, oxygen adsorbed on the surface of the oxidation catalyst may be removed to recover the catalytic activation of the oxidation catalyst.

Figure 2:
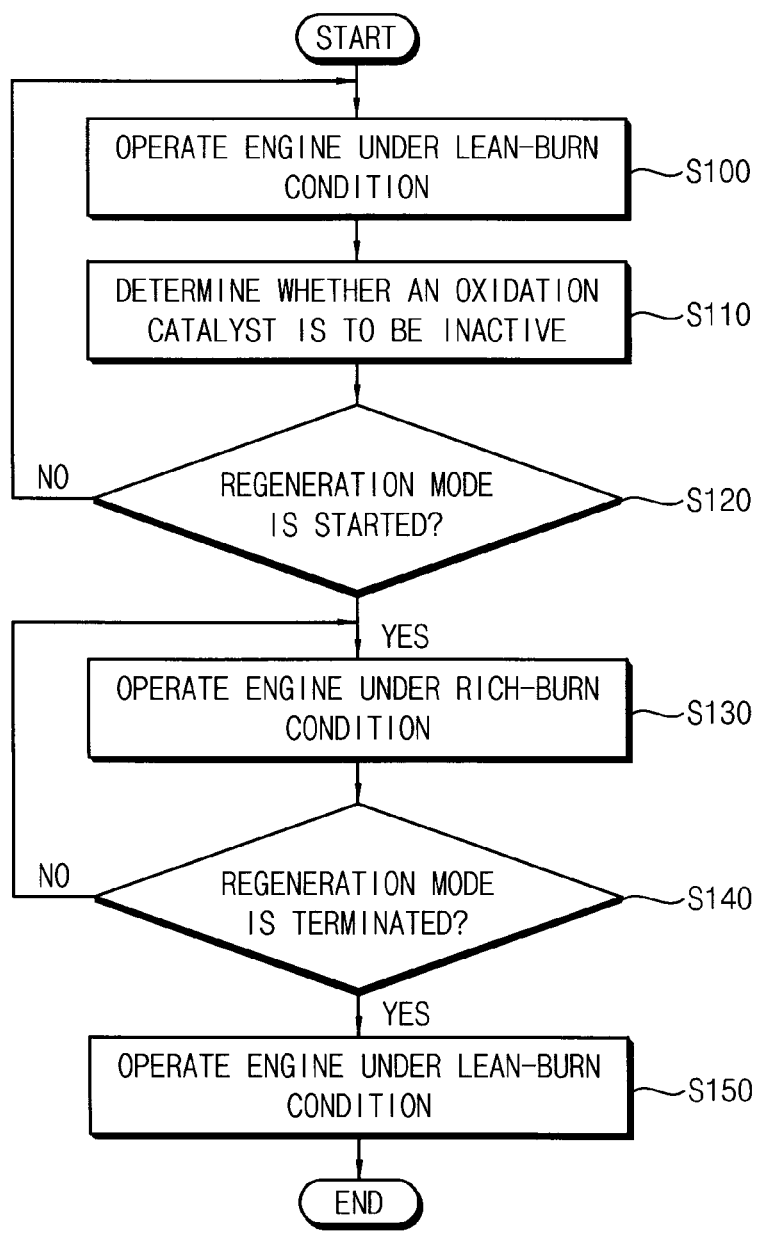
Figure 3:
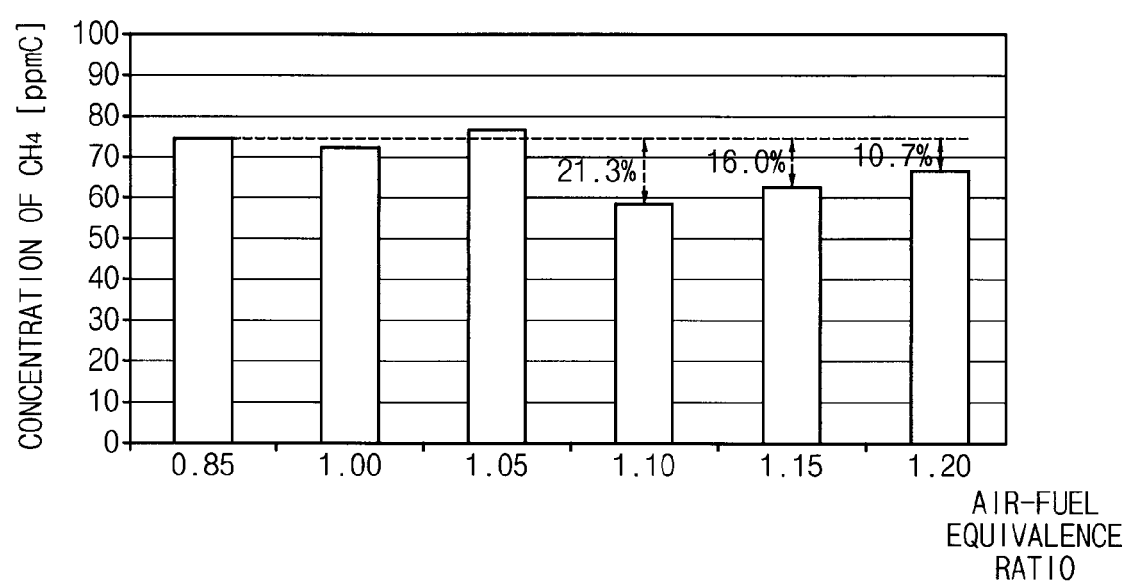
Figure 4:
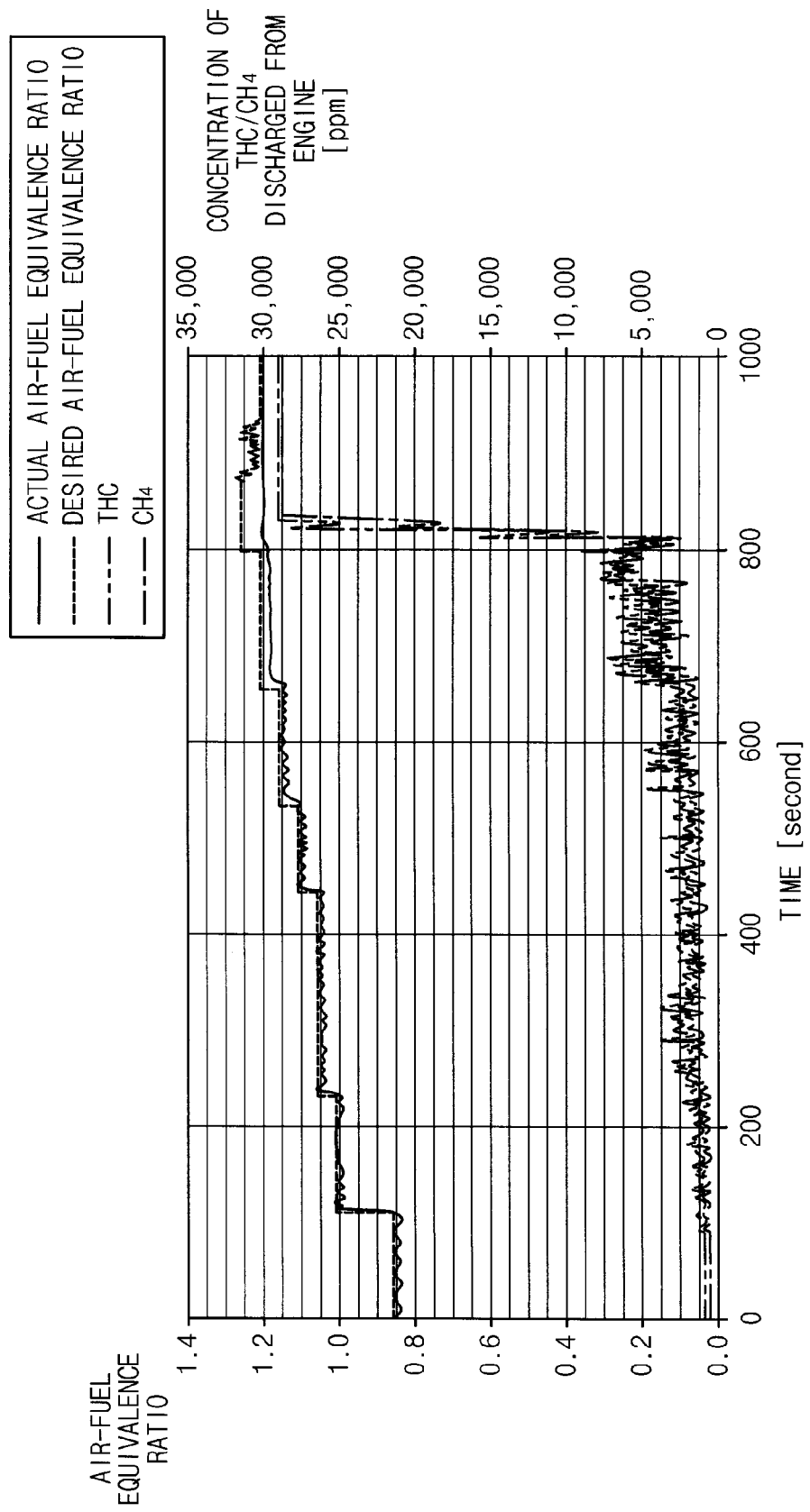
Figure 5:
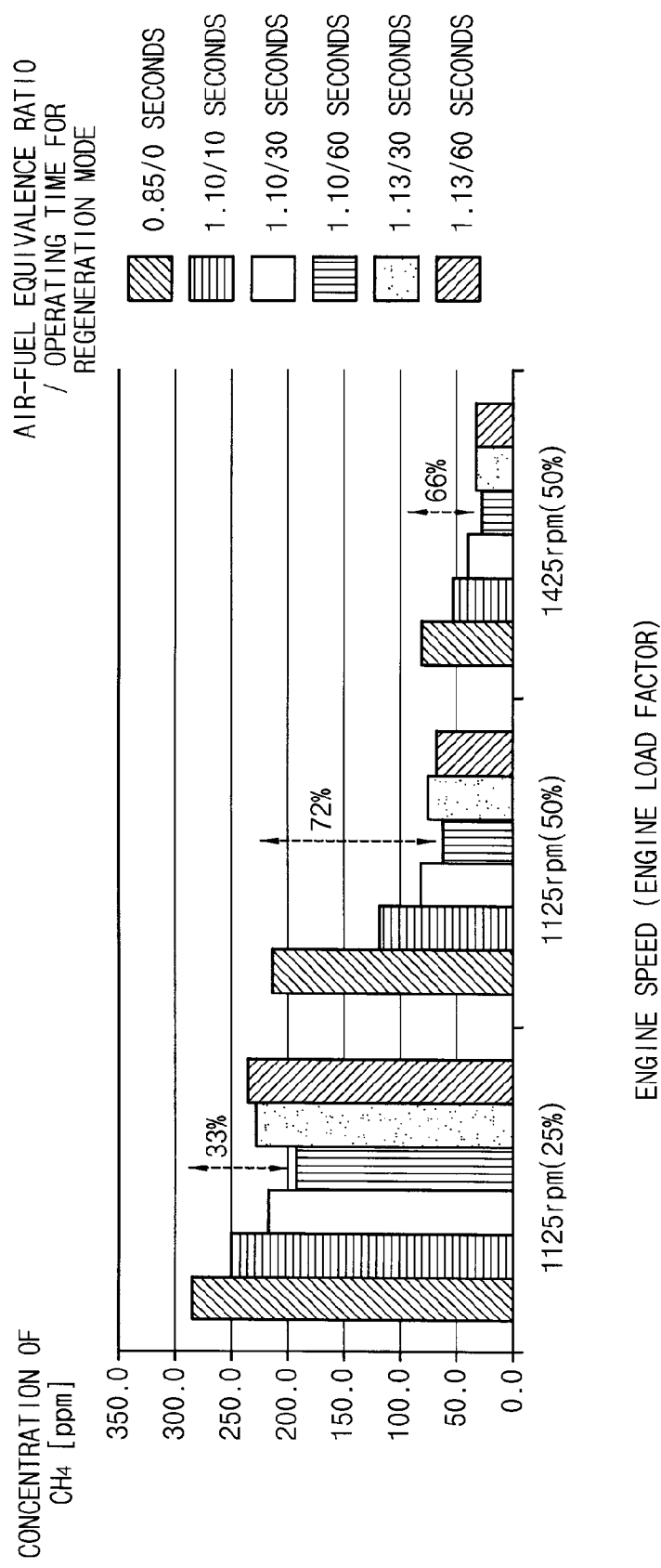

FIG. 2 is a flow chart illustrating an engine control method for maintaining performance of an oxidation catalyst in accordance with example embodiments. FIG. 3 is a graph illustrating concentration of methane discharged from a tailpipe versus air-fuel equivalence ratio. FIG. 4 is a graph illustrating concentration of an exhaust gas discharged from an engine versus time according to changes of air-fuel equivalence ratio. FIG. 5 is a graph illustrating concentration of methane discharged from a tailpipe versus an engine speed according to changes of air-fuel equivalence ratio and regeneration mode operating time.

Referring to FIGS. 2 to 5, first, fuel is burned under lean-burn condition in a compressed natural gas engine (S100). For example, the engine may be operated in the lean-burn condition where air-fuel equivalence ratio of a mixture gas entering the engine is set to be smaller than 1.

The air-fuel equivalence ratio may represent a ratio of a theoretical air-fuel ratio to an actual air-fuel ratio. When the air-fuel equivalence ratio is greater than 1, the combustion process may be performed under the rich-burn condition having rich-fuel and lean-air. On the other hand, when the air-fuel equivalence ratio is smaller than 1, the combustion process may be performed under the lean-burn condition having lean-fuel and rich-air.

Then, an activation of an oxidation catalyst may be determined (S110).

In example embodiments, when the temperature difference between the front end and the rear end of the oxidation catalyst is smaller than a predetermined temperature, the oxidation catalyst may be determined to be inactive. For example, an electronic control unit (ECU) may receive temperature information of the oxidation catalyst from temperature sensors installed in the front and rear ends of the oxidation catalyst. When the temperature difference between the front and rear ends of the oxidation catalyst is smaller than 30° C., the oxidation catalyst may be determined to be inactive.

In this case, the front end of the oxidation catalyst may be a portion of the oxidation catalyst which an exhaust gas discharged from the engine flows into, and the rear end of the oxidation catalyst may be a portion of the oxidation catalyst from which the exhaust gas passing through the oxidation catalyst is emitted to a tailpipe.

The oxidation catalyst may convert the exhaust gas discharged from the engine into carbon dioxide and water which are harmless to a human body. This conversion process may be an exothermic reaction. When the oxidation catalyst is active, a temperature of the rear end of the oxidation catalyst may be greater than that of the front end of the oxidation catalyst. That is, the great temperature difference between the front end and the rear end of the oxidation catalyst may represent that the oxidation reaction of the oxidation catalyst may be occurring more actively. On the contrary, the small temperature difference between the front end and the rear end of the oxidation catalyst may represent that the oxidation reaction of the oxidation catalyst may be occurring less actively. Accordingly, by monitoring the temperature difference between the front and rear ends of the oxidation catalyst, the oxidation catalyst may be determined whether it is an inactive state.

In example embodiments, when the conversion efficiency of methane of the oxidation catalyst is smaller than a predetermined efficiency, the oxidation catalyst may be determined to be inactive. For example, the electronic control unit may receive temperature information of the oxidation catalyst from the temperature sensors installed in the front and rear ends of the oxidation catalyst, and may calculate conversion efficiency of methane of the oxidation catalyst using the temperature information. When the calculated conversion efficiency of methane is smaller than a predetermined efficiency, the oxidation catalyst may be determined to be inactive.

Alternatively, a catalyst regeneration mode may be operated at regular intervals, regardless of whether the oxidation catalyst is inactive or not. For example, the electronic control unit may monitor mileage, operating time, and fuel consumption of vehicle, and may run the catalyst regeneration mode for recovering the catalytic activation of the oxidation catalyst at predetermined intervals.

Then, necessity of the regeneration mode for recovering the catalytic activation of the oxidation catalyst may be determined (S120).

In example embodiments, the necessity of the regeneration mode may be determined depending on the catalytic activation of the oxidation catalyst. For example, the catalytic activation of the oxidation catalyst may be determined using the conversion efficiency of methane. When the oxidation catalyst is determined to be inactive, the regeneration mode may be determined to be necessary.

In example embodiments, when the engine operates at idle speed or at a speed lower than 1000 rpm, the regeneration mode may be determined to be necessary.

The step of regenerating the oxidation catalyst may be performed by burning fuel in the rich-burn condition. In the rich-burn, greater amount of fuel than a theoretical fuel amount required for ideal perfect combustion may be supplied, and thus load on the engine may be increased to thereby damage the engine. Accordingly, in order to ensure stability of the engine, the regeneration mode may be performed only in case that the engine operates at idle speed or at a speed lower than 1000 rpm.

When the regeneration of the oxidation catalyst is determined to be necessary, the engine may be operated in rich-burn condition by increasing the air-fuel equivalence ratio, to regenerate the oxidation catalyst (S130).

For example, when the oxidation catalyst is inactive and an engine speed is lower than a predetermined speed, the regeneration of the oxidation catalyst may be determined to be necessary. In this case, the air-fuel equivalence ratio may be increased to regenerate the oxidation catalyst.

In example embodiments, the step of regenerating the oxidation catalyst may include a step of increasing the air-fuel equivalence ratio to a range of from about 1.10 to about 1.20 to operate the engine in rich-burn condition.

FIG. 3 shows that concentration of methane discharged from the tailpipe may be reduced after performing the regeneration mode. In particular, the air-fuel equivalence ratio was increased and the engine was operated under the rich-burn condition for 60 seconds. Then, the air-fuel equivalence ratio was returned to 0.85 and the engine was operated with an engine speed of 1125 rpm and engine load factor of 50%. Then, the concentration of methane discharged from the tailpipe was measured. As illustrated in FIG. 3, by performing the regeneration mode in which the engine is operated under the air-fuel equivalence ratio in a range of from 1.10 to 1.20, an amount of methane discharged from the tailpipe was significantly reduced. This means that the catalytic activation of the oxidation catalyst can be recovered through the regeneration mode.

In particular, as the engine is operated in lean-burn condition, e.g., the air-fuel equivalence ratio of about 0.85, concentration of methane discharged from the tailpipe may be increased to a level of 75 ppmC. For example, total hydrocarbon emissions may be about 0.749 g/kW·h which exceeds the regulatory limit of 0.6 g/kW·h. The total hydrocarbon may include methane hydrocarbon and non-methane hydrocarbon.

By applying the regeneration mode to the inactivated oxidation catalyst, the catalytic activation of the oxidation catalyst may be recovered. For example, when the engine is operated under rich-burn condition with the air-fuel equivalence of about 1.10, concentration of methane discharged from the tailpipe may be reduced to 59 ppmC level, which is decreased by 21.3% from before the regeneration mode is performed. In this case, the total discharge amount of hydrocarbon may be 0.583 g/kW·h, which satisfies the regulatory limit. Further, after operating the engine under the rich-burn condition with the air-fuel equivalence ratio of about 1.15, concentration of methane discharged from the tailpipe may be reduced to 62 ppmC level, which is decreased by 16.0% from before performing the regeneration mode. In this case, the total discharge amount of hydrocarbon may be 0.570 g/kW·h, which satisfies the regulatory limit.

FIG. 4 is a graph illustrating concentration of the exhaust gas discharged from the engine according to increase of the air-fuel equivalence ratio from 0.85. The electronic control unit may send a signal value corresponding to desired air-fuel equivalence ratio to the engine. In the engine, the mixture gas may be burned under actual air-fuel equivalence ratio. In this case, the actual air-fuel equivalence ratio may be different from the desired air-fuel equivalence ratio. After the burning, the engine may discharge exhaust gas, e.g., methane, or the like.

Referring to FIG. 4, when the air-fuel equivalence ratio exceeds 1.20, concentration of total hydrocarbon discharged from the engine may be rapidly increased. In this case, most of the exhaust gas may be methane. That is, an oversupplied fuel may not be fully burned and may be discharged as it is. The methane may react with the oxidation catalyst to raise temperature of the oxidation catalyst, and thus, even worse, the oxidation catalyst may be broken.

Referring to FIG. 5, when the engine is operated for 60 seconds with the air-fuel equivalence ratio of about 1.10, the catalytic activation of the oxidation catalyst may be recovered maximally.

In particular, after operating the engine for 10 seconds with the air-fuel equivalence ratio of about 1.10, the engine may be operated with the air-fuel equivalence ratio of about 0.85, engine speed of 1125 rpm, and engine load factor of 25%, and then, an amount of methane discharged from the tailpipe may be measured. Then, the engine load factor and the engine speed may be increased to 50% and 1426 rpm, respectively, and then, an amount of methane discharged from the tailpipe may be measured. Similarly, the operating time of the regeneration mode may be increased to 30 seconds and 60 seconds, respectively, and then, an amount of methane discharged from the tailpipe may be measured. The same experiments may be repeated with the air-fuel equivalence ratio of about 1.13.

From the experiment as described above, when the air-fuel equivalence ratio is increased to about 1.10 and the engine is operated under rich-burn condition for 60 seconds, an amount of methane emissions may be the smallest. In particular, when engine speed is 1125 rpm and engine load factor is 50%, an amount of methane emissions may be reduced up to 72% when compared to a case that the regeneration mode is not performed.

In example embodiments, the engine control method may include a step of operating the engine under rich-burn condition and in condition that temperature of the front end of the oxidation catalyst is in a range of about 300° C. to about 500° C.

When the engine is operated under rich-burn condition, fuel may be incompletely burned and amount of carbon monoxide and hydrocarbon of the exhaust gas may be increased. The increased carbon monoxide and hydrocarbon may be oxidized in the oxidation catalyst, to generate heat, and thus temperature of the oxidation catalyst may be increased. If the engine is operated under rich-burn condition when a temperature of the oxidation catalyst is already high, temperature of the oxidation catalyst may be increased too highly by the increased carbon monoxide and hydrocarbon, and even worse, the oxidation catalyst may be broken. Accordingly, the engine control method may control the engine such that the regeneration mode is performed when temperature of the oxidation catalyst is in a predetermined range.

In example embodiments, the engine control method may further include a step of informing an operator that the regeneration mode is running. For example, when the air-fuel equivalence ratio is increased to run the regeneration mode, the electronic control device may inform the operator that the regeneration mode is running, using warning light, buzzer, display device, or the like.

Then, whether to terminate the regeneration mode may be determined (S140).

In example embodiments, the step of determining whether to terminate the regeneration mode may include a step of measuring conversion efficiency of methane of the oxidation catalyst. For example, the electronic control unit may receive temperature information of the oxidation catalyst from the temperature sensors installed in the front and rear ends of the oxidation catalyst, and may calculate conversion efficiency of methane of the oxidation catalyst using the temperature information. When the calculated conversion efficiency of methane is greater than a predetermined efficiency, the oxidation catalyst may be determined to be active and the regeneration mode may be terminated.

In example embodiments, when temperature of the front end of the oxidation catalyst is greater than 500° C., the regeneration mode may be terminated.

For example, the electronic control unit may receive temperature information of the exhaust gas discharged from the engine from the temperature sensors installed in the front end of the oxidation catalyst. When the temperature of the exhaust gas is increased to more than 500° C., the regeneration mode may be terminated to protect the oxidation catalyst.

In example embodiments, when the regeneration mode operating time is greater than a predetermined time, the regeneration mode may be terminated. For example, after the engine is operated under rich-burn condition for 60 seconds at which the catalytic activation of the oxidation catalyst is recovered maximally, the regeneration mode may be terminated.

Finally, the air-fuel equivalence ratio may be reduced to terminate the regeneration mode (S150).

When the termination conditions of the regeneration mode are satisfied, the electronic control unit may reduce the air-fuel equivalence ratio to terminate the regeneration mode. For example, the electronic control unit may increase the air-fuel equivalence ratio for the predetermined time, and may operate the engine under the regeneration mode. Then, the electronic control unit may reduce the air-fuel equivalence ratio back to 0.85, and may operate the engine under lean-burn condition.

As mentioned above, the engine control method for maintaining performance of the oxidation catalyst may increase the air-fuel equivalence ratio to regenerate inactivated oxidation catalyst. In particular, when the air-fuel equivalence ratio is increased to about 1.10 and the engine is operated under rich-burn condition for 60 seconds, an effect of the catalytic activation recovery of the oxidation catalyst may be maximized.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An engine control method for maintaining performance of an oxidation catalyst, comprising:
    burning fuel of a compressed natural gas engine under a lean-burn condition with an air-fuel equivalence ratio less than or equal to 1;
    determining whether an oxidation catalyst for purifying an exhaust gas of the engine is inactive;
    determining necessity of a regeneration mode for recovering catalytic activation of the oxidation catalyst according to an activation state of the oxidation catalyst and an operating condition of the engine; and
    regenerating the oxidation catalyst by increasing the air-fuel equivalence ratio to a range of from 1.10 to 1.20 when the oxidation catalyst is inactive and an engine speed is lower than a predetermined speed.

2. The method of claim 1, wherein determining whether the oxidation catalyst is inactive comprises at least one selected from the group consisting of measuring a temperature difference between a front end and a rear end of the oxidation catalyst, measuring conversion efficiency of methane of the oxidation catalyst, measuring mileage of vehicle, measuring operating time of the vehicle, and measuring fuel consumption of the vehicle.

3. The method of claim 2, wherein determining whether the oxidation catalyst is inactive comprises determining the oxidation catalyst to be inactive when the temperature difference between the front and rear ends of the oxidation catalyst is less than 30° C.

4. The method of claim 1, wherein regenerating the oxidation catalyst comprises increasing the air-fuel equivalence ratio to a range of from 1.10 to 1.20 when temperature of a front end of the oxidation catalyst is in a range of 300° C. to 500° C.

5. The method of claim 1, wherein determining the necessity of the regeneration mode comprises determining that the regeneration mode is necessary when the engine speed is lower than 1000 rpm.

6. The method of claim 5, wherein determining the necessity of the regeneration mode comprises determining that the regeneration mode is necessary when the engine operates at idle speed.

7. The method of claim 1, wherein the regeneration mode continues for a predetermined time.

8. The method of claim 1, further comprising terminating the regeneration mode when temperature of a front end of the oxidation catalyst is greater than 500° C.

9. The method of claim 1, wherein further comprising informing an operator that the regeneration mode is running.

* * * * *